(No Model.)
L. K. JEWETT.
ANTI FRICTION BEARING.
No. 440,711. Patented Nov. 18, 1890.
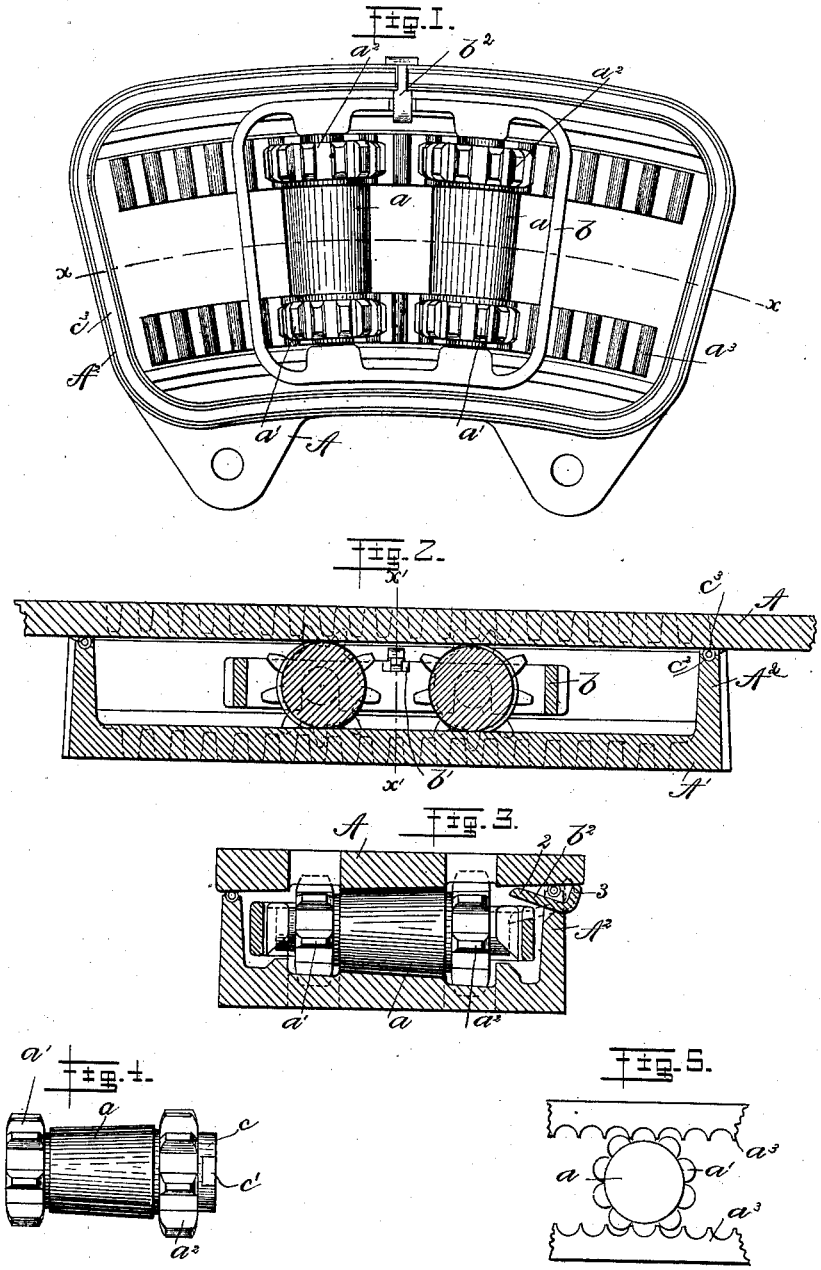
Witnesses.
Geo. C. Hemting
Frederick L. Emery
Inventor.
Luther K. Jewett,
by Crosby & Gregory
Attys.

UNITED STATES PATENT OFFICE.

LUTHER K. JEWETT, OF BOSTON, MASSACHUSETTS, ASSIGNOR TO THE JEWETT SUPPLY COMPANY, OF PORTLAND, MAINE.

ANTI-FRICTION BEARING.

SPECIFICATION forming part of Letters Patent No. 440,711, dated November 18, 1890.

Application filed March 18, 1890. Serial No. 344,419. (No model.)

*To all whom it may concern:*

Be it known that I, LUTHER K. JEWETT, of Boston, county of Suffolk, State of Massachusetts, have invented an Improvement in Anti-Friction Bearings or Supports, of which the following description, in connection with the accompanying drawings, is a specification, like letters on the drawings representing like parts.

This invention has for its object to provide a novel anti-friction bearing, support, or device especially adapted, among other things, to be used between car-bodies and their car-trucks as a side bearing for the said car-body.

My present invention is an improvement upon that shown and described in another application, Serial No. 336,636, filed by me January 11, 1890, and has for its object to improve and simplify the construction of the same.

In accordance with my present invention the anti-friction bearing or device is composed of two substantially parallel flat bearing-surfaces, each provided with a rack-bar, and one or more conically-shaped rollers interposed between the said bearing-surfaces and provided at their opposite ends with gear-teeth to engage the rack-bars on the said bearing-surfaces, whereby one or more of the said rollers may be employed. The anti-friction rollers, when two or more are used, have preferably co-operating with them a spacing-frame provided, as herein shown, with a tooth or notch adapted to be engaged by a pawl or locking projection to hold the rollers in their proper position, while the car-body and the upper bearing-surface attached thereto are lowered into correct position on the car-truck, to which the lower bearing-surface is secured. The locking projection or pawl is constructed so as to be tipped out of engagement with the notch or tooth in the spacing-frame when the car-body is lowered. The lower bearing-surface is provided with an upright flange extended entirely around the said bearing-surface, and preferably provided on its upper face with a recess or groove into which may be placed felt or other packing material, with which the upper bearing-surface makes contact when the car-body is lowered into position on its truck, the said packing material rendering the anti-friction bearing dust-tight.

My invention in an anti-friction device therefore consists in the combination, with two bearing-surfaces provided with rack-bars, of one or more intermediate anti-friction rollers provided at its opposite ends with gears to engage the rack-bars on the bearing-surfaces, substantially as will be described.

Other features of my invention will be pointed out in the claims at the end of this specification.

Figure 1 is a top or plan view of the anti-friction bearing with the upper bearing-surface removed; Fig. 2, a longitudinal section of the anti-friction bearing, taken on the line $x\ x$, Fig. 1; Fig. 3, a transverse section of the anti-friction bearing on line $x'\ x'$, Fig. 2; Figs. 4 and 5, modifications to be referred to.

The upper bearing-surface A and the lower bearing-surface A', provided with the upright $A^2$, may be made of iron or steel or other suitable material capable of withstanding wear.

The upper and lower bearing-surfaces A A' are made flat or substantially parallel and have interposed between them one or more anti-friction rollers $a$, herein shown as conically shaped and provided on its opposite sides with gears $a'\ a^2$, which mesh with gear-teeth or rack-bars $a^3$ on the upper and lower bearing-surfaces, there preferably being two rack-bars on each of said bearing-surfaces. Preferably each bearing-surface will be provided with two rack-bars $a^3$, with which mesh the gears $a'\ a^2$ of the rollers $a$. When two or more anti-friction rollers $a$ are used, a spacing-frame $b$ will preferably be employed with the said rollers, substantially as shown and described in the application referred to, the said spacing-frame being movable with the said rollers, it being herein shown as supported upon the arbors of the said rollers.

The spacing-frame $b$ on one side, and preferably between the rollers $a$, is provided with a notch or tooth $b'$, adapted to receive one arm 2 of a lever $b^2$, extended through a slot in the flange $A^2$, the said lever outside of the flange $A^2$ being provided with an upturned arm 3, which normally extends above the upper surface of the flange $A^2$, and is adapted to be engaged by the upper bearing-surface A when the latter is lowered upon the anti-friction rollers $a$, the said lever being tipped, so as to disengage the arm 2 from the notch or tooth $b'$ of the spacing-frame, thereby leaving the said spacing-frame and the anti-friction rollers free to move.

The rack-bars $a^3$ are preferably provided with teeth rounded at their ends to engage round-shaped teeth of the gears $a\,a'$, as clearly shown in Fig. 5, so that when the upper bearing-surface is lowered down into engagement with the anti-friction rollers the rack-bar teeth will readily slip into position in engagement with the teeth of the gears.

The conically-shaped rollers $a$ afford an increased bearing-surface for the top and bottom bearing-surfaces A A' and receive the entire load of the car, substantially as described in the application referred to.

I shall preferably use two or more anti-friction rollers, each provided with gears at their opposite ends, and while I prefer to employ two or more rollers I do not desire to limit my invention in this respect, as a single roller provided with gears at its opposite ends may be used with good results.

When a single roller is used, it will preferably be provided with an extended arbor $c$, as shown in Fig. 4, which arbor is provided with a notch $c'$, adapted to receive an arm 2 of the locking pawl or lever $b^2$, so that the said roller may be maintained in correct position while the car-body is being lowered upon its truck.

In order to render the anti-friction bearing or device substantially dust-tight, preferably the flange $A^2$ is provided on its upper surface with a groove or channel $c^2$, into which is laid a packing $c^3$, of felt or other textile or suitable material, with which the upper bearing-surface comes in contact when in proper working position.

I have herein shown the flange $A^2$ as secured to or forming part of the lower bearing-surface; but I do not desire to limit myself in this respect, as it is manifestly evident that the said flange may be secured to or form part of the upper bearing-surface.

I claim—

1. In an anti-friction bearing or support, the combination, with two bearing-surfaces provided with rack-bars, of one or more intermediate anti-friction rollers provided at its opposite ends with gears to engage the rack-bars on the bearing-surfaces, substantially as described.

2. In an anti-friction bearing or support, the combination, with two bearing-surfaces provided with rack-bars, of one or more intermediate anti-friction rollers provided at its opposite ends with gears to engage the rack-bars on the bearing-surfaces, and a locking device to hold said rollers in proper working position, substantially as described.

3. In an anti-friction bearing or support, the combination, with two bearing-surfaces provided with rack-bars, of one or more intermediate anti-friction rollers provided at its opposite ends with gears to engage the rack-bars on the bearing-surfaces, a spacing-frame movable with the rollers, and a locking device to engage said spacing-frame, substantially as described.

4. In an anti-friction bearing or support, the combination, with two flat bearing-surfaces provided with rack-bars, a flange $A^2$, secured to or forming part of one of said bearing-surfaces, and a packing interposed between the said flange and one of the bearing-surfaces, of an anti-friction roller or rollers interposed between said surfaces and provided with gears to engage said rack-bars, substantially as described.

5. In an anti-friction bearing or support, the combination, with two flat bearing-surfaces, a flange $A^2$, secured to or forming part of one of said surfaces, and a packing interposed between said flange and bearing-surface, of an anti-friction device or roller interposed between the said bearing-surfaces, substantially as described.

In testimony whereof I have signed my name to this specification in the presence of two subscribing witnesses.

LUTHER K. JEWETT.

Witnesses:
JAS. H. CHURCHILL,
EMMA J. BENNETT.